(12) United States Patent
Jackson

(10) Patent No.: US 12,448,460 B2
(45) Date of Patent: Oct. 21, 2025

(54) TREATMENT OF LUNG CANCER USING AN ANTI-FUCOSYL-GM1 ANTIBODY

(71) Applicant: BRISTOL-MYERS SQUIBB COMPANY, Princeton, NJ (US)

(72) Inventor: Jeffrey R. Jackson, Schwenksville, PA (US)

(73) Assignee: BRISTOLS-MYERS SQUIBB COMPANY, Princeton, NJ (US)

( * ) Notice: Subject to any disclaimer, the term of this patent is extended or adjusted under 35 U.S.C. 154(b) by 842 days.

(21) Appl. No.: 17/581,085

(22) Filed: Jan. 21, 2022

(65) Prior Publication Data

US 2022/0144967 A1    May 12, 2022

Related U.S. Application Data

(63) Continuation of application No. 16/563,317, filed on Sep. 6, 2019, now abandoned, which is a continuation of application No. 15/512,522, filed as application No. PCT/US2015/051827 on Sep. 24, 2015, now abandoned.

(60) Provisional application No. 62/055,276, filed on Sep. 25, 2014.

(51) Int. Cl.
*A61K 39/00* (2006.01)
*A61K 39/395* (2006.01)
*C07K 16/30* (2006.01)
*C07K 16/46* (2006.01)

(52) U.S. Cl.
CPC .... *C07K 16/3023* (2013.01); *A61K 39/39558* (2013.01); *C07K 16/3084* (2013.01); *C07K 16/46* (2013.01); *A61K 2039/505* (2013.01); *C07K 2317/33* (2013.01); *C07K 2317/41* (2013.01)

(58) Field of Classification Search
CPC ........ A61K 39/39558; A61K 2039/505; C07K 16/3084; C07K 2317/33; C07K 2317/41; A61P 35/00
See application file for complete search history.

(56) References Cited

U.S. PATENT DOCUMENTS

| | | |
|---|---|---|
| 8,383,118 B2 | 2/2013 | Vistica et al. |
| 9,138,475 B2 | 9/2015 | Vistica et al. |
| 2010/0297138 A1 | 11/2010 | Vistica et al. |

OTHER PUBLICATIONS

Brezicka et al., Int. J. Cancer, "Tumor-Cell Killing by MAbs Against Fucosyl GM1, a Ganglioside Antigen Associated With Small-Cell Lung Carcinoma", vol. 49, (6), p. 911, 1991.

*Primary Examiner* — Lei Yao
(74) *Attorney, Agent, or Firm* — Gregory R. Bellomy; Angela Guo

(57) ABSTRACT

This disclosure provides a method for treating a subject afflicted with a lung cancer, which method comprises administering to the subject a therapeutically effective amount of an antibody or an antigen-binding portion thereof that specifically binds to Fucosyl-GM1.

10 Claims, 5 Drawing Sheets
Specification includes a Sequence Listing.

FIG. 1A

```
Anti-Fucosyl GM1 7E4 VH

V-segment: VH3-48
     D-segment: D1-1
     J-segment: JH6b

E    V    Q    L    V    E    S    G    G    G    S    V    Q    P    G    E    S    L
  1     GAA  GTG  CAG  CTG  GTG  GAG  TCT  GGG  GGA  GGC  TCG  GTA  CAG  CCT  GGG  GAG  TCC  CTG
                                                                            CDR 1
                                                                    ~~~~~~~~~~~~~~~~~~
         R    L    S    C    V    A    S    G    F    T    F    S    R    Y    K    M    N    W
 55     AGA  CTC  TCC  TGT  GTA  GCC  TCT  GGA  TTC  ACC  TTC  AGT  AGG  TAC  AAG  ATG  AAC  TGG
                                                                            CDR 2
                                                                    ~~~~~~~~~~~~~~~~~~
         V    R    Q    A    P    G    K    G    L    E    W    V    S    Y    I    S    R    S
109     GTC  CGC  CAG  GCT  CCA  GGG  AAG  GGA  CTG  GAA  TGG  GTT  TCA  TAC  ATT  AGT  CGT  AGT
              CDR 2
     ~~~~~~~~~~~~~~~~~~~~~~~~~~~~~~~~~~~~~~~~~~~
         G    R    D    I    Y    Y    A    D    S    V    K    G    R    F    T    I    S    R
163     GGT  CGT  GAC  ATA  TAC  TAC  GCA  GAC  TCT  GTG  AAG  GGC  CGA  TTC  ACC  ATC  TCC  AGA

D    N    A    K    N    S    L    Y    L    Q    M    N    S    L    R    D    E    D
217     GAC  AAT  GCC  AAG  AAC  TCA  CTG  TAT  CTG  CAA  ATG  AAC  AGC  CTG  AGA  GAC  GAG  GAC
                                                                 CDR 3
                                                        ~~~~~~~~~~~~~~~~~~~~~~~~~~~~~~~~~~~~
         T    A    V    Y    Y    C    A    G    T    V    T    T    Y    Y    Y    D    F    G
271     ACG  GCT  GTG  TAT  TAC  TGT  GCG  GGA  ACT  GTA  ACG  ACA  TAC  TAC  TAC  GAC  TTC  GGT
         CDR 3                          |            D1-1          |↳   JH6b
     ~~~~~~~~~~~~
         M    D    V    W    G    Q    G    T    T    V    T    V    S    S
325     ATG  GAC  GTC  TGG  GGC  CAA  GGG  ACC  ACG  GTC  ACC  GTC  TCC  TCA
```

FIG. 1B

```
Anti-Fucosyl GM1 7E4 VK

V-segment:  L15
    J-segment:  JK4

D   I   Q   M   T   Q   S   P   S   S   L   S   A   S   V   G   D   R
  1    GAC ATC CAG ATG ACC CAG TCT CCA TCC TCA CTG TCT GCA TCT GTA GGA GAC AGA

CDR 1
                                            ~~~~~~~~~~~~~~~~~~~~~~~~~~~~~~~~~~~~
        V   T   I   T   C   R   A   S   Q   G   I   S   S   W   L   A   W   Y
 55    GTC ACC ATC ACT TGT CGG GCG AGT CAG GGT ATT AGC AGC TGG TTA GCC TGG TAT

CDR 2
                                                          ~~~~~~~~~~~~~~~~~~~~~~
        Q   Q   K   P   E   K   A   P   K   S   L   I   Y   A   A   S   S   L
109    CAG CAG AAA CCA GAG AAA GCC CCT AAG TCC CTG ATC TAT GCT GCA TCC AGT TTG

CDR 2
       ~~~~~~~~~
        Q   S   G   V   P   S   R   F   S   G   S   G   S   G   T   D   F   T
163    CAA AGT GGG GTC CCA TCA AGG TTC AGC GGC AGT GGA TCT GGG ACA GAT TTC ACT

CDR 3
                                                                      ~~~~~~~~
        L   T   I   S   S   L   Q   P   E   D   F   A   T   Y   Y   C   Q   Q
217    CTC ACC ATC AGC AGC CTG CAG CCT GAA GAT TTT GCA ACT TAT TAC TGC CAA CAG

CDR 3
       ~~~~~~~~~~~~~~~~~~~~~~~~~~~~
        Y   N   S   Y   P   P   T   F   G   G   G   T   K   V   E   I   K
271    TAT AAT AGT TAC CCT CCC ACT TTC GGC GGA GGG ACC AAG GTG GAG ATC AAA
                                    └──► JK4
```

[a] At the same dose, n = cumulative number of DLT evaluable subjects, k = cumulative number of subjects who experienced DLT.

[b] Treat the next cohort of subjects at the next higher dose.

[c] Treat 3 more subjects at the current dose.

[d] Treat 3 more subjects at the next lower dose.

[e] Unacceptable current dose. Do not re-escalate.

[f] At least one subject must be evaluable for safety.

TREATMENT OF LUNG CANCER USING AN ANTI-FUCOSYL-GM1 ANTIBODY

CROSS-REFERENCE TO RELATED APPLICATION

This application claims priority to U.S. application Ser. No. 16/563,317, filed on Sep. 6, 2019, which is a continuation patent application to U.S. Ser. No. 15/512,522, filed Mar. 17, 2017, which is a § 371 National Phase of PCT/US2015/051827, filed Sep. 24, 2015, which claims priority to U.S. Provisional Application Ser. No. 62/055,276, filed Sep. 25, 2014, the entire contents of which are incorporated herein by reference.

FIELD OF THE INVENTION

The present invention relates to improved methods for administration of antibodies to fucosyl-GM1 to treat cancer.

BACKGROUND OF THE INVENTION

Fucosyl-GM1 is a sphingolipid monosialoganglioside composed of a ceramide lipid component, which anchors the molecule in the cell membrane, and a carbohydrate component that is exposed at the cell surface. Carbohydrate antigens are the most abundantly expressed antigens on the cell surface of cancers (Feizi, T., *Nature*, 314:53-57 (1985)). In some tumor types, such as small cell lung cancer (SCLC), initial responses to chemotherapy are impressive, but chemo-refractory relapses rapidly follows. Intervention with novel immunotherapeutics may succeed in overcoming drug resistant relapse (Johnson, D. H., *Lung Cancer*, 12(Suppl. 3):571-575 (1995)). Several carbohydrate antigens, such as gangliosides GD3 and GD2, have been shown to function as effective targets for passive immunotherapy with MAbs (Irie, R. F. et al., *Proc. Natl. Acad. Sci.*, 83:8694-8698 (1986); Houghton, A. N. et al., *Proc. Natl. Acad. Sci.*, 82:1242-1246 (1985)). Ganglioside antigens have also been demonstrated to be effective targets for active immunotherapy with vaccines in clinical trials (Krug, L. M. et al., *Clin. Cancer Res.*, 10:6094-6100 (2004); Dickler, M. N. et al., *Clin. Cancer Res.*, 5:2773-2779 (1999); Livingston, P. O. et al., *J. Clin. Oncol.*, 12:1036-1044 (1994)). Indeed, serum derived from SCLC patients who developed antibody titers to Fucosyl-GM1 following vaccination with KLH conjugated antigen, demonstrated specific binding to tumor cells and tumor specific complement dependant cytotoxicity (CDC). Anti-Fucosyl-GM1 titer associated toxicities were mild and transient and three patients with limited-stage SCLC were relapse-free at 18, 24, and 30 months (Krug et al., supra; Dickler et al., supra).

Fucosyl-GM1 expression has been shown in a high percentage of SCLC cases and unlike other ganglioside antigens, Fucosyl-GM1 has little or no expression in normal tissues (Nilsson et al., *Glycoconjugate J.*, 1:43-49 (1984); Krug et al., supra; Brezicka et al., *Cancer Res.*, 49:1300-1305 (1989); Zhangyi et al., *Int. J Cancer*, 73:42-49 (1997); Brezicka et al., *Lung Cancer*, 28:29-36 (2000); Fredman et al., *Biochim. Biophys. Acta*, 875:316-323 (1986); Brezicka et al., *APMIS*, 99:797-802 (1991); Nilsson et al., *Cancer Res.*, 46:1403-1407 (1986)). The presence of Fucosyl-GM1 has been demonstrated in culture media from SCLC cell lines, in tumor extracts and serum of nude mouse xenografts and in the serum of SCLC patients with extensive-stage disease (Vangsted et al., *Cancer Res.*, 51:2879-2884 (1991); Vangsted et al., *Cancer Detect. Prev.*, 18:221-229 (1994)). These reports provide convincing evidence for Fucosyl-GM1 as a highly specific tumor antigen, which may be targeted by an immunotherapeutic.

Accordingly, agents that recognize Fucosyl-GM1, and methods of using such agents, are desired for cancer therapy.

SUMMARY OF THE INVENTION

In certain embodiments, the present invention provides a method for treating a subject afflicted with a lung cancer, comprising administering to the subject a therapeutically effective amount of a monoclonal antibody or an antigen-binding portion thereof that binds specifically to Fucosyl-GM1. In a specific aspect, the anti-Fucosyl-GM1 antibody, or an antigen-binding portion thereof, is administered according to a particular clinical dosage regimen (i.e., at a particular dose amount and according to a specific dosing schedule). In one embodiment, the subject (e.g., a human subject) suffers from small cell lung cancer (SCLC). In another embodiment, the subject has previously received an initial anti-cancer therapy. In another embodiment, the lung cancer is an advanced, metastatic, relapsed, and/or refractory lung cancer.

In certain embodiments, the anti-Fucosyl-GM1 antibody cross-competes with BMS-986012 for binding to Fucosyl-GM1 is BMS-986012. Optionally, the antibody is a chimeric, humanized or human monoclonal antibody or a portion thereof. Optionally, the antibody comprises a human IgG1 or IgG4 heavy chain constant region. Optionally, the antibody is non-fucosylated. To illustrate, the antibody is BMS-986012. In one embodiment, the antibody or antigen-binding portion thereof comprises: (a) a heavy chain variable region CDR1 comprising SEQ ID NO: 5; (b) a heavy chain variable region CDR2 comprising SEQ ID NO: 6; (c) a heavy chain variable region CDR3 comprising SEQ ID NO: 7; (d) a light chain variable region CDR1 comprising SEQ ID NO: 8; (e) a light chain variable region CDR2 comprising SEQ ID NO: 9; and (f) a light chain variable region CDR3 comprising SEQ ID NO: 10. In another embodiment, the antibody or antigen-binding portion thereof comprises heavy and light chain variable regions comprising the sequences set forth in SEQ ID NOs: 3 and 4, respectively.

In certain embodiments, the anti-Fucosyl-GM1 antibody is administered at a dose ranging from 10 to 2000 mg once every 1, 2, 3 or 4 weeks. For example, the antibody is administered at a dose ranging from 20 to1000 mg once every 3 weeks. Optionally, the method comprises at least one treatment cycle of three weeks. For example, the method comprises at least four treatment cycles of three weeks. To illustrate, the antibody is administered on Days 1, 22, 43, and 64. In certain specific embodiments, the antibody is administered according to at least one of the following dosing regimens: (a) about 20 mg of the antibody, e.g., 20 mg, every 3 weeks; (b) about 70 mg of the antibody, e.g., 70 mg, every 3 weeks; (c) about 160 mg of the antibody, e.g., 160 mg, every 3 weeks; (d) about 400 mg of the antibody, e.g., 400 mg, every 3 weeks; and (e) about 1000 mg of the antibody, e.g., 1000 mg, every 3 weeks. In one embodiment, the antibody is formulated for intravenous administration. Preferably, administration of the antibody induces a durable clinical response in the subject. Optionally, administration of the antibody is continued for as long as clinical benefit is observed or until unmanageable toxicity or disease progression occurs. The efficacy of the treatment methods provided herein can be assessed using any suitable means. In one embodiment, the treatment produces at least one therapeutic effect selected from the group consisting of reduction in size of the cancer, reduction in number of metastatic lesions over time, complete response, partial response, and stable disease.

In certain embodiments, the present invention provides a kit for treating a subject afflicted with a lung cancer, the kit comprising: (a) a dosage ranging from 10 to 2000 mg (e.g., at a dosage from 20 to 1000 mg) of an anti-Fucosyl-GM1 antibody or an antigen-binding portion thereof and (b) instructions for using the antibody in the method of the present invention.

Other features and advantages of the instant invention will be apparent from the following detailed description and examples, which should not be construed as limiting. The contents of all cited references, including scientific articles, newspaper reports, GENBANK® entries, patents and patent applications cited throughout this application are expressly incorporated herein by reference.

BRIEF DESCRIPTION OF THE DRAWINGS

FIG. 1A shows the nucleotide sequence (SEQ ID NO: 1) and amino acid sequence (SEQ ID NO: 3) of the heavy chain variable region of the 7E4 human monoclonal antibody. The CDR1 (SEQ ID NO: 5), CDR2 (SEQ ID NO: 6) and CDR3 (SEQ ID NO: 7) regions are delineated and the V, D and J germline derivations are indicated.

FIG. 1B shows the nucleotide sequence (SEQ ID NO: 2) and amino acid sequence (SEQ ID NO: 4) of the light chain variable region of the 7E4 human monoclonal antibody. The CDR1 (SEQ ID NO: 8), CDR2 (SEQ ID NO: 9) and CDR3 (SEQ ID NO: 10) regions are delineated and the V and J germline derivations are indicated.

DETAILED DESCRIPTION OF THE INVENTION

Figure 2:
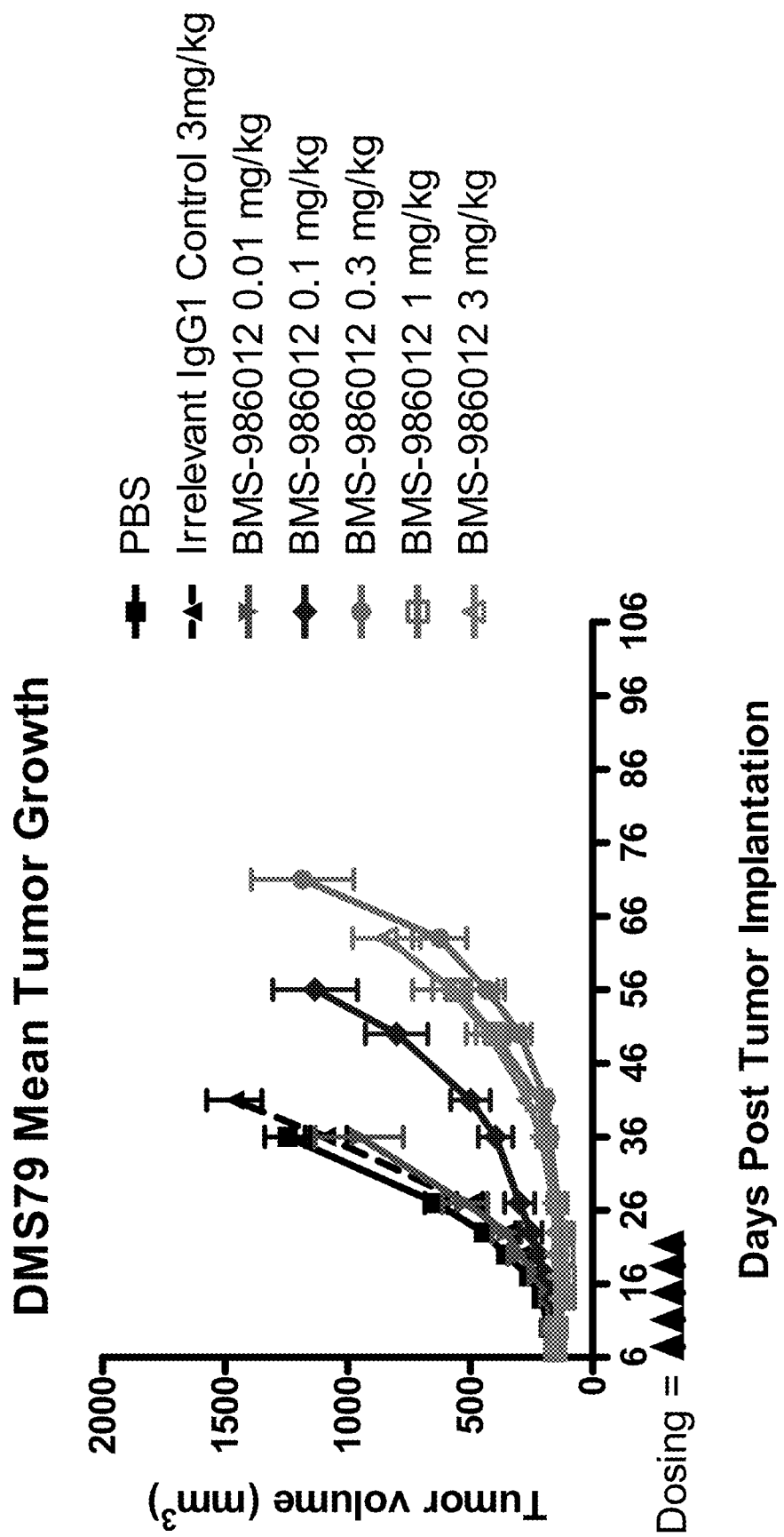
FIG. 2 shows BMS-986012 dose response on DMS79 xenografts.

The present invention relates to methods for treating a lung cancer patient comprising administering to the patient an anti-Fucosyl-GM1 antibody (e.g., BMS-986012) or an antigen-binding portion thereof.

BMS-986012 is a first-in-class fully human monoclonal antibody (MAb) that specifically binds to the Fucosyl-GM1 (Fuc-GM1) ganglioside. BMS-986012 exhibits high-affinity and dose-dependent saturable binding to Fuc-GM1 and shows no detectable antigen-specific binding to closely related molecule GM1. BMS-986012 is non-fucosylated (lacking fucosylation on the Fc domain). The absence of the fucosyl group in BMS-986012 confers higher affinity for Fc receptors resulting in enhanced antibody-dependent cellular cytotoxicity (ADCC). Furthermore, the antibody was shown to mediate potent complement dependent cytotoxicity (CDC) as well as antibody-dependent cellular phagocytosis (ADCP). See, for example, WO 2007/067992, the content of which is expressly incorporated herein by reference.

The present invention is based at least in part on data from preclinical studies conducted in animal tumor models. The results demonstrated that an anti-Fucosyl-GM1 antibody (e.g., BMS-986012) is effective in treating a lung cancer.

I. Definitions

In order that the present disclosure may be more readily understood, certain terms are first defined. As used in this application, except as otherwise expressly provided herein, each of the following terms shall have the meaning set forth below. Additional definitions are set forth throughout the application.

"Administering" refers to the physical introduction of a composition comprising a therapeutic agent to a subject, using any of the various methods and delivery systems known to those skilled in the art. Preferred routes of administration for the anti-Fucosyl-GM1 antibody include intravenous, intramuscular, subcutaneous, intraperitoneal, spinal or other parenteral routes of administration, for example, by injection or infusion. The phrase "parenteral administration" as used herein means modes of administration other than enteral and topical administration, usually by injection, and includes, without limitation, intravenous, intramuscular, intraarterial, intrathecal, intralymphatic, intralesional, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion, as well as in vivo electroporation. The TKI is typically administered via a non-parenteral route, preferably orally. Other non-parenteral routes include a topical, epidermal or mucosal route of administration, for example, intranasally, vaginally, rectally, sublingually or topically. Administering can also be performed, for example, once, a plurality of times, and/or over one or more extended periods.

An "adverse event" (AE) as used herein is any unfavorable and generally unintended or undesirable sign (including an abnormal laboratory finding), symptom, or disease associated with the use of a medical treatment. A medical treatment may have one or more associated AEs and each AE may have the same or different level of severity. Reference to methods capable of "altering adverse events" means a treatment regime that decreases the incidence and/or severity of one or more AEs associated with the use of a different treatment regime.

An "antibody" (Ab) shall include, without limitation, a glycoprotein immunoglobulin that binds specifically to an antigen and comprises at least two heavy (H) chains and two light (L) chains interconnected by disulfide bonds, or an antigen-binding portion thereof. Each H chain comprises a heavy chain variable region (abbreviated herein as $V_H$) and a heavy chain constant region. The heavy chain constant region comprises three constant domains, $C_{H1}$, $C_{H2}$ and $C_{H3}$. Each light chain comprises a light chain variable region (abbreviated herein as $V_L$) and a light chain constant region. The light chain constant region is comprises one constant domain, $C_L$. The $V_H$ and $V_L$ regions can be further subdivided into regions of hypervariability, termed complementarity determining regions (CDRs), interspersed with regions that are more conserved, termed framework regions (FR). Each $V_H$ and $V_L$ comprises three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the Abs may mediate the binding of the immunoglobulin to host tissues or factors, including various cells of the immune system (e.g., effector cells) and the first component (C1q) of the classical complement system.

An immunoglobulin may derive from any of the commonly known isotypes, including but not limited to IgA, secretory IgA, IgG and IgM. IgG subclasses are also well known to those in the art and include but are not limited to human IgG1, IgG2, IgG3 and IgG4. "Isotype" refers to the Ab class or subclass (e.g., IgM or IgG1) that is encoded by the heavy chain constant region genes. The term "antibody" includes, by way of example, both naturally occurring and non-naturally occurring Abs; monoclonal and polyclonal Abs; chimeric and humanized Abs; human or nonhuman Abs; wholly synthetic Abs; and single chain Abs. A nonhuman Ab may be humanized by recombinant methods to reduce its immunogenicity in man. Where not expressly stated, and unless the context indicates otherwise, the term "antibody" also includes an antigen-binding fragment or an antigen-binding portion of any of the aforementioned immunoglobulins, and includes a monovalent and a divalent fragment or portion, and a single chain Ab.

An "isolated antibody" refers to an Ab that is substantially free of other Abs having different antigenic specificities (e.g., an isolated Ab that binds specifically to Fucosyl-GM1 is substantially free of Abs that bind specifically to antigens other than Fucosyl-GM1). Moreover, an isolated Ab may be substantially free of other cellular material and/or chemicals.

The term "monoclonal antibody" ("MAb") refers to a non-naturally occurring preparation of Ab molecules of single molecular composition, i.e., Ab molecules whose primary sequences are essentially identical, and which exhibits a single binding specificity and affinity for a particular epitope. A MAb is an example of an isolated Ab. MAbs may be produced by hybridoma, recombinant, transgenic or other techniques known to those skilled in the art.

A "human" antibody (HuMAb) refers to an Ab having variable regions in which both the framework and CDR regions are derived from human germline immunoglobulin sequences. Furthermore, if the Ab contains a constant region, the constant region also is derived from human germline immunoglobulin sequences. The human Abs of the invention may include amino acid residues not encoded by human germline immunoglobulin sequences (e.g., mutations introduced by random or site-specific mutagenesis in vitro or by somatic mutation in vivo). However, the term "human antibody", as used herein, is not intended to include Abs in which CDR sequences derived from the germline of another mammalian species, such as a mouse, have been grafted onto human framework sequences. The terms "human" Abs and "fully human" Abs and are used synonymously.

A "humanized antibody" refers to an Ab in which some, most or all of the amino acids outside the CDR domains of a non-human Ab are replaced with corresponding amino acids derived from human immunoglobulins. In one embodiment of a humanized form of an Ab, some, most or all of the amino acids outside the CDR domains have been replaced with amino acids from human immunoglobulins, whereas some, most or all amino acids within one or more CDR regions are unchanged. Small additions, deletions, insertions, substitutions or modifications of amino acids are permissible as long as they do not abrogate the ability of the Ab to bind to a particular antigen. A "humanized" Ab retains an antigenic specificity similar to that of the original Ab.

A "chimeric antibody" refers to an Ab in which the variable regions are derived from one species and the constant regions are derived from another species, such as an Ab in which the variable regions are derived from a mouse Ab and the constant regions are derived from a human Ab.

An "anti-antigen" Ab refers to an Ab that binds specifically to the antigen. For example, an anti-Fucosyl-GM1 Ab binds specifically to Fucosyl-GM1.

An "antigen-binding portion" of an Ab (also called an "antigen-binding fragment") refers to one or more fragments of an Ab that retain the ability to bind specifically to the antigen bound by the whole Ab.

A "cancer" refers a broad group of various diseases characterized by the uncontrolled growth of abnormal cells in the body. Unregulated cell division and growth divide and grow results in the formation of malignant tumors that invade neighboring tissues and may also metastasize to distant parts of the body through the lymphatic system or bloodstream. The terms, "cancer", "tumor", and "neoplasm", are used interchangeably herein.

A "subject" includes any human or nonhuman animal. The term "nonhuman animal" includes, but is not limited to, vertebrates such as nonhuman primates, sheep, dogs, and rodents such as mice, rats and guinea pigs. In preferred embodiments, the subject is a human. The terms, "subject" and "patient" are used interchangeably herein.

A "therapeutically effective amount" or "therapeutically effective dosage" of a drug or therapeutic agent is any amount of the drug that, when used alone or in combination with another therapeutic agent, protects a subject against the onset of a disease or promotes disease regression evidenced by a decrease in severity of disease symptoms, an increase in frequency and duration of disease symptom-free periods, or a prevention of impairment or disability due to the disease affliction. The ability of a therapeutic agent to promote disease regression can be evaluated using a variety of methods known to the skilled practitioner, such as in human subjects during clinical trials, in animal model systems predictive of efficacy in humans, or by assaying the activity of the agent in in vitro assays.

By way of example, an "anti-cancer agent" promotes cancer regression in a subject. In preferred embodiments, a therapeutically effective amount of the drug promotes cancer regression to the point of eliminating the cancer. "Promoting cancer regression" means that administering an effective amount of the drug, alone or in combination with an anti-neoplastic agent, results in a reduction in tumor growth or size, necrosis of the tumor, a decrease in severity of at least one disease symptom, an increase in frequency and duration of disease symptom-free periods, or a prevention of impairment or disability due to the disease affliction. In addition, the terms "effective" and "effectiveness" with regard to a treatment includes both pharmacological effectiveness and physiological safety. Pharmacological effectiveness refers to the ability of the drug to promote cancer regression in the patient. Physiological safety refers to the level of toxicity, or other adverse physiological effects at the cellular, organ and/or organism level (adverse effects) resulting from administration of the drug.

By way of example for the treatment of tumors, a therapeutically effective amount of an anti-cancer agent preferably inhibits cell growth or tumor growth by at least about 20%, more preferably by at least about 40%, even more preferably by at least about 60%, and still more preferably by at least about 80% relative to untreated subjects. In other preferred embodiments of the invention, tumor regression may be observed and continue for a period of at least about 20 days, more preferably at least about 40 days, or even more preferably at least about 60 days. Notwithstanding these ultimate measurements of therapeutic effectiveness, evaluation of immunotherapeutic drugs must also make allowance for "immune-related" response patterns.

A therapeutically effective amount of a drug includes a "prophylactically effective amount", which is any amount of the drug that, when administered alone or in combination with an anti-neoplastic agent to a subject at risk of developing a cancer (e.g., a subject having a pre-malignant condition) or of suffering a recurrence of cancer, inhibits the development or recurrence of the cancer. In preferred embodiments, the prophylactically effective amount prevents the development or recurrence of the cancer entirely. "Inhibiting" the development or recurrence of a cancer means either lessening the likelihood of the cancer's development or recurrence, or preventing the development or recurrence of the cancer entirely.

The use of the alternative (e.g., "or") should be understood to mean either one, both, or any combination thereof of the alternatives. As used herein, the indefinite articles "a" or "an" should be understood to refer to "one or more" of any recited or enumerated component.

The terms "about" or "comprising essentially of" refer to a value or composition that is within an acceptable error range for the particular value or composition as determined by one of ordinary skill in the art, which will depend in part on how the value or composition is measured or determined, i.e., the limitations of the measurement system. For example, "about" or "comprising essentially of" can mean within 1 or more than 1 standard deviation per the practice in the art. Alternatively, "about" or "comprising essentially of" can mean a range of up to 20%. Furthermore, particularly with respect to biological systems or processes, the terms can mean up to an order of magnitude or up to 5-fold of a value. When particular values or compositions are provided in the application and claims, unless otherwise stated, the meaning of "about" or "comprising essentially of" should be assumed to be within an acceptable error range for that particular value or composition.

As described herein, any concentration range, percentage range, ratio range or integer range is to be understood to include the value of any integer within the recited range and, when appropriate, fractions thereof (such as one-tenth and one-hundredth of an integer), unless otherwise indicated.

Various aspects of the invention are described in further detail in the following subsections.

II. Anti-Fucosyl-GM1 Antibodies

HuMAbs that bind specifically to Fucosyl-GM1 with high affinity have been disclosed in U.S. Pat. No. 8,383,118 and WO 2007/067992 (e.g., human monoclonal antibodies 5B1, 5Bla, 7D4, 7E4, 13B8 and 18D5). Each of the HuMAbs disclosed in U.S. Pat. No. 8,383,118 has been demonstrated to exhibit one or more desirable functional properties: (1) specifically binds to Fucosyl-GM1; (2) binds to Fucosyl-GM1 with high affinity (for example, with a $K_D$ of $1 \times 10^{-7}$ M or less); (c) binds to the human small cell lung cancer cell line DMS-79 (Human SCLC ATCC® No. CRL-2049); and (d) inhibit growth of tumor cells in vitro or in vivo. Preferably, the antibody binds to Fucosyl-GM1 with a $K_D$ of $5 \times 10^{-8}$ M or less, binds to Fucosyl-GM1 with a $K_D$ of $1 \times 10^{-8}$ M or less, binds to Fucosyl-GM1 with a $K_D$ of $5 \times 10^{-9}$ M or less, or binds to Fucosyl-GM1 with a $K_D$ of between $1 \times 10^{-8}$ M and $1 \times 10^{-10}$ M or less. Standard assays to evaluate the binding ability of the antibodies toward Fucosyl-GM1 are known in the art, including, for example, ELISAs, Western blots and RIAs. The binding kinetics (e.g., binding affinity) of the antibodies also can be assessed by standard assays known in the art, such as by ELISA, Scatchard and BIACORE® analysis.

A preferred anti-Fucosyl-GM1 Ab is BMS-986012 (also referred to as MDX-1110 or 7E4).

Anti-Fucosyl-GM1 Abs usable in the disclosed methods also include isolated Abs that bind specifically to Fucosyl-GM1 and cross-compete for binding to Fucosyl-GM1 with BMS-986012 (see, e.g., U.S. Pat. No. 8,383,118; WO 2007/067992). The ability of Abs to cross-compete for binding to an antigen indicates that these Abs bind to the same epitope region of the antigen and sterically hinder the binding of other cross-competing Abs to that particular epitope region. These cross-competing Abs are expected to have functional properties very similar those of BMS-986012 by virtue of their binding to the same epitope region of Fucosyl-GM1. Cross-competing Abs can be readily identified based on their ability to cross-compete with BMS-986012 in standard Fucosyl-GM1 binding assays such as BIACORE® analysis, ELISA assays or flow cytometry (see, e.g., WO 2013/173223).

For administration to human subjects, these Abs are preferably chimeric Abs, or more preferably humanized or human Abs. Such chimeric, humanized or human MAbs can be prepared and isolated by methods well known in the art. Anti-Fucosyl-GM1 Abs usable in the methods of the disclosed invention also include antigen-binding portions of the above Abs. It has been amply demonstrated that the antigen-binding function of an Ab can be performed by fragments of a full-length Ab. Examples of binding fragments encompassed within the term "antigen-binding portion" of an Ab include (i) a Fab fragment, a monovalent fragment consisting of the $V_L$, $V_H$, $C_L$ and $C_{H1}$ domains; (ii) a F(ab')$_2$ fragment, a bivalent fragment comprising two Fab fragments linked by a disulfide bridge at the hinge region; (iii) a Fd fragment consisting of the $V_H$ and $C_{H1}$ domains; and (iv) a Fv fragment consisting of the $V_L$ and $V_H$ domains of a single arm of an Ab. Anti-Fucosyl-GM1 antibodies (or $V_H$ and/or $V_L$ domains derived therfrom) suitable for use in the invention can be generated using methods well known in the art.

An exemplary anti-Fucosyl-GM1 antibody is BMS-986012 comprising heavy and light chains comprising the sequences shown in SEQ ID NOs: 3 and 4, respectively, or antigen binding fragments and variants thereof.

In other embodiments, the antibody has heavy and light chain CDRs or variable regions of BMS-986012. Accordingly, in one embodiment, the antibody comprises CDR1, CDR2, and CDR3 domains of the $V_H$ of BMS-986012 having the sequence set forth in SEQ ID NO: 3, and CDR1, CDR2 and CDR3 domains of the $V_L$ of BMS-986012 having the sequence set forth in SEQ ID NO: 4. In another embodiment, the antibody comprises the heavy chain CDR1, CDR2 and CDR3 domains comprising the sequences set forth in SEQ ID NOs: 5, 6, and 7, respectively, and the light chain CDR1, CDR2 and CDR3 domains comprising the sequences set forth in SEQ ID NOs: 8, 9, and 10, respectively. In another embodiment, the antibody comprises $V_H$ and/or $V_L$ regions comprising the amino acid sequences set forth in SEQ ID NO: 3 and/or SEQ ID NO: 4, respectively. In another embodiment, the antibody competes for binding with and/or binds to the same epitope on Fucosyl-GM1 as the above-mentioned antibodies. In another embodiment, the antibody has at least about 90% variable region amino acid sequence identity with the above-mentioned antibodies (e.g., at least about 90%, 95% or 99% variable region identity with SEQ ID NO: 3 or SEQ ID NO: 4).

III. Pharmaceutical Compositions

Therapeutic agents (e.g., anti-Fucosyl-GM1 antibodies) of the present invention may be constituted in a composition, e.g., a pharmaceutical composition containing and a pharmaceutically acceptable carrier. As used herein, a "pharmaceutically acceptable carrier" includes any and all solvents, dispersion media, coatings, antibacterial and antifungal agents, isotonic and absorption delaying agents, and the like that are physiologically compatible. "Pharmaceutically acceptable" means approved by a government regulatory agency or listed in the U.S. Pharmacopeia or another generally recognized pharmacopeia for use in animals, particularly in humans. The term "carrier" refers to a diluent, adjuvant, excipient, or vehicle with which the compound is administered. Such pharmaceutical carriers can be sterile liquids, such as water and oils, including those of petroleum, animal, vegetable or synthetic origin, such as peanut oil, soybean oil, mineral oil, sesame oil, glycerol polyethylene glycol ricinoleate, and the like. Water or aqueous solution saline and aqueous dextrose and glycerol solutions may be employed as carriers, particularly for injectable solutions (e.g., comprising an anti-Fucosyl-GM1 antibody). Preferably, the carrier for a composition containing an Ab is suitable for intravenous, intramuscular, subcutaneous, parenteral, spinal or epidermal administration (e.g., by injection or infusion). A pharmaceutical composition of the invention may include one or more pharmaceutically acceptable salts, anti-oxidant, aqueous and non-aqueous carriers, and/or adjuvants such as preservatives, wetting agents, emulsifying agents and dispersing agents.

Liquid compositions for parenteral administration can be formulated for administration by injection or continuous infusion. Routes of administration by injection or infusion include intravenous, intraperitoneal, intramuscular, intrathecal and subcutaneous. In one embodiment, the anti-Fucosyl-GM1 antibody is administered intravenously.

IV. Methods of Therapies

Provided herein are clinical methods for treating a lung cancer (e.g., small cell lung cancer) in a subject (e.g., a human subject), comprising administering to the subject a therapeutically effective amount of an anti-Fucosyl-GM1 antibody or an antigen-binding portion thereof. In one embodiment, the subject has previously received an initial anti-cancer therapy. In another embodiment, the lung cancer is an advanced, metastatic, relapsed, and/or refractory lung cancer.

In a particular embodiment, the anti-Fucosyl-GM1 antibody is BMS-986012. In another embodiment, dosage regimens are adjusted to provide the optimum desired response (e.g., an effective response).

In one embodiment, the dose of the anti-Fucosyl-GM1 antibody is calculated per body weight, e.g., mg/kg body weight. In another embodiment, the dose of the anti-Fucosyl-GM1 antibody is a flat-fixed dose. In another embodiment, the dose of the anti-Fucosyl-GM1 antibody is varied over time. For example, the anti-Fucosyl-GM1 antibody may be initially administered at a high dose and may be lowered over time. In another embodiment, the anti-Fucosyl-GM1 antibody is initially administered at a low dose and increased over time.

In another embodiment, the amount of the antibody administered is constant. In another embodiment, the amount of the antibody administered varies with each dose. For example, the maintenance (or follow-on) dose of the antibody can be higher or the same as the loading dose that is first administered. In another embodiment, the maintenance dose of the antibody can be lower or the same as the loading dose.

In another embodiment, the antibody is administered as a first line of treatment (e.g., the initial or first treatment). In another embodiment, the antibody is administered as a second line of treatment (e.g., after the initial or first treatment, including after relapse and/or where the first treatment has failed).

Dosage and frequency vary depending on the half-life of the Ab in the subject. In general, human Abs show the longest half-life, followed by humanized Abs, chimeric Abs, and nonhuman Abs. The dosage and frequency of administration can vary depending on whether the treatment is prophylactic or therapeutic. In prophylactic applications, a relatively low dosage is typically administered at relatively infrequent intervals over a long period of time. Some patients continue to receive treatment for the rest of their lives. In therapeutic applications, a relatively high dosage at relatively short intervals is sometimes required until progression of the disease is reduced or terminated, and preferably until the patient shows partial or complete amelioration of symptoms of disease. Thereafter, the patient can be administered a prophylactic regime.

Actual dosage levels of the active ingredients in the pharmaceutical compositions of the present invention may be varied so as to obtain an amount of the active ingredient that is effective to achieve the desired therapeutic response for a particular patient, composition, and mode of administration, without being unduly toxic to the patient. The selected dosage level will depend upon a variety of pharmacokinetic factors including the activity of the particular compositions of the present invention employed, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors well known in the medical arts. A composition of the present invention can be administered via one or more routes of administration using one or more of a variety of methods well known in the art. As will be appreciated by the skilled artisan, the route and/or mode of administration will vary depending upon the desired results.

In certain embodiments, the anti-Fucosyl-GM1 antibody is administered at a dose ranging from 10 to 2000 mg once every 1, 2, 3 or 4 weeks. For example, the antibody is administered at a dose ranging from 20 to1000 mg once every 3 weeks. Optionally, the method comprises at least one treatment cycle of three weeks. For example, the method comprises at least four treatment cycles of three weeks. To illustrate, the antibody is administered on Days 1, 22, 43, and 64.

In certain specific embodiments, the antibody is administered according to at least one of the following dosing regimens: (a) about 20 mg of the antibody every 3 weeks; (b) about 70 mg of the antibody every 3 weeks; (c) about 160 mg of the antibody every 3 weeks; (d) about 400 mg of the antibody every 3 weeks; and (e) about 1000 mg of the antibody every 3 weeks. Preferably, administration of the antibody induces a durable clinical response in the subject. Optionally, administration of the antibody is continued for as long as clinical benefit is observed or until unmanageable toxicity or disease progression occurs. The efficacy of the treatment methods provided herein can be assessed using any suitable means. In one embodiment, the treatment produces at least one therapeutic effect selected from the group consisting of reduction in size of the cancer, reduction in number of metastatic lesions over time, complete response, partial response, and stable disease.

Patients treated according to the methods disclosed herein preferably experience improvement in at least one sign of cancer. In one embodiment, improvement is measured by a reduction in the quantity and/or size of measurable tumor lesions. In another embodiment, lesions can be measured on chest x-rays or CT or MRI films. In another embodiment, cytology or histology can be used to evaluate responsiveness to a therapy.

In one embodiment, the patient treated exhibits a complete response (CR), a partial response (PR), or stable disease (SD). In another embodiment, the patient treated experiences tumor shrinkage and/or decrease in growth rate, i.e., suppression of tumor growth. In another embodiment, unwanted cell proliferation is reduced or inhibited. In yet another embodiment, one or more of the following can occur: the number of cancer cells can be reduced; tumor size can be reduced; cancer cell infiltration into peripheral organs can be inhibited, retarded, slowed, or stopped; tumor metastasis can be slowed or inhibited; tumor growth can be inhibited; recurrence of tumor can be prevented or delayed; one or more of the symptoms associated with cancer can be relieved to some extent.

V. Kits and Unit Dosage Forms

Also provided herein are kits that include a pharmaceutical composition containing an anti-Fucosyl-GM1 antibody (such as BMS-986012), and a pharmaceutically acceptable carrier, in a therapeutically effective amount adapted for use in the preceding methods.

The kits optionally can also include instructions, e.g., comprising administration schedules, to allow a practitioner (e.g., a physician, nurse, or patient) to administer the composition contained therein to administer the composition to a patient having a cancer (e.g., a lung cancer). The kit can also include a syringe.

Optionally, the kits include multiple packages of the single-dose pharmaceutical compositions each containing an effective amount of the antibody for a single administration in accordance with the methods provided above. Instruments or devices necessary for administering the pharmaceutical composition(s) also may be included in the kits. For instance, a kit may provide one or more pre-filled syringes containing an amount of the antibody.

In certain embodiments, the present invention provides a kit for treating a subject afflicted with a lung cancer, the kit comprising: (a) a dosage ranging from 10 to 2000 mg (e.g., at a dosage from 20 to 1000 mg) of an anti-Fucosyl-GM1 antibody or an antigen-binding portion thereof; and (b) instructions for using the antibody in the method of the present invention. In certain specific embodiments, the dosage of the antibody of the kit is about 20 mg, 70 mg, 160 mg, 400 mg, or 1000 mg.

The following Examples are merely illustrative and should not be construed as limiting the scope of this disclosure in any way as many variations and equivalents will become apparent to those skilled in the art upon reading the present disclosure.

The contents of all references, GENBANK® entries, patents and published patent applications cited throughout this application are expressly incorporated herein by reference.

Example 1

Pre-Clinical In Vivo Efficacy Studies of BMS-986012

BMS-986012 is a first-in-class fully human immunoglobulin G (IgG) monoclonal antibody (MAb) that specifically binds to the Fucosyl-GM1 (Fuc-GM1) ganglioside. Immunohistochemical (IHC) analysis of tumor samples with an anti-Fucosyl-GM1 MAb has demonstrated antigen expression in a high percentage of SCLC cases and little or no expression in normal tissues (Brezicka, T. et al., *Lung Cancer*, 28:29-36 (2000); Brezicka, F. T. et al., *APMIS*, 99:797-802 (1991); Zhang, S. et al., *Int. J. Cancer*, 73:42-49 (1997); Fredman, P. et al., *Biochim. Biophys. Acta*, 875:316-323 (1986); Brezicka, F. T. et al., *Cancer Res.*, 49(5):1300-1305 (1989); Nilsson, O. et al., *Cancer Res.*, 46:1403-1407 (1986)). BMS-986012 exhibits high-affinity and dose-dependent saturable binding to Fuc-GM1 and shows no detectable antigen-specific binding to closely related molecule GM1. BMS-986012 was optimized to have enhanced effector functions by elimination of the fucosylation on the Fc domain. The absence of this fucosyl group in BMS-986012 (resulting from its expression in a cell line deficient in fucosyl transferase) confers higher affinity for Fc receptors resulting in enhanced antibody-dependent cellular cytotoxicity (ADCC). Furthermore, the antibody was shown to mediate potent complement dependent cytotoxicity (CDC) as well as antibody-dependent cellular phagocytosis (ADCP). See, for example, WO 2007/067992, the content of which is expressly incorporated herein by reference.

BMS-986012 in vivo efficacy was demonstrated in five of seven mouse xenograft models tested. Table 1 below summarizes the tumor growth inhibition data for the various xenograft studies conducted.

TABLE 1

Efficacy of BMS-986012 on Fucosyl-GM1 Expressing Xenografts

| Model | Efficacy (TGI) |
| --- | --- |
| DMS79* | 95% |
| DMS53** | 92% |
| H128** | 20%^ |
| H4IIE** | 100% |
| H740*** | 39% |
| H209*** | None |
| H187** | 66% |

*3 mg/kg
**10 mg/kg
***30 mg/kg
TGI—mean tumor growth inhibition when all mice were in study (between Day 15-69).
^BMS-986012 induced a 20% TGI in the H128 model - not statistically significant.

In one example, BMS-986012 induced dose-dependent tumor growth inhibition on DMS79 xenografts while the IgG1 isotype control had no anti-tumor efficacy (see FIG. 2). Maximal efficacy appears to be reached at 0.3 mg/kg with near complete TGI of 95% to 98% at day 36. All doses of BMS-986012 were well-tolerated with no body weight changes or signs of toxicity throughout the study. In a second xenograft model (DMS53), BMS-986012 at 0.3, 10 and 30 mg/kg resulted in statistically significant mean tumor growth inhibition of 85%, 92% and 92%, respectively, compared with the PBS group and cachexia was delayed in the BMS-986012 treated group. Body weight loss correlated well with tumor burden.

Collectively, these data support that BMS-986012 has significant anti-tumor activity in multiple tumor models.

Example 2

Preclinical Pharmacology and Toxicity of BMS-986012

1. Pharmacology

BMS-986012 exhibits high affinity, dose dependent and saturable binding to Fuc-GM1 and shows no detectable antigen specific binding to a closely related molecule, GM1. Fuc-GM1 is a chemically defined antigen that is identical in all species; therefore BMS-986012 demonstrates high affinity binding to antigen in all species including mouse, cynomolgus monkeys, and humans. Immunohistochemical (IHC) analysis of tumor samples with the use of a specific mouse monoclonal antibody to Fuc-GM1 has demonstrated antigen expression in a high percentage of small cell lung cancer (SCLC) cases.

BMS-986012 is expressed in a fucosyl transferase deficient Chinese hamster ovary (CHO) cell line resulting in the production of an antibody lacking fucose in its oligosaccharide chains. The absence of fucose from the oligosaccharide of IgG1 conveys increased antibody affinity for Fc receptor CD16 (FcγRIIIa). This FcγR is expressed on NK cells and macrophages and is responsible for ADCC. BMS-986012 demonstrated a 40× increase in binding affinity for CD16 and a resulting 150× increase in ADCC activity, compared with parental fucosylated monoclonal antibody. In vitro, the antibody was shown to mediate potent complement dependent cytotoxicity (CDC) as well as antibody dependent cellular phagocytosis (ADCP). Robust in vivo tumor growth inhibition was demonstrated in five out of seven tumor xenograft models treated with BMS-986012 as a monotherapy.

2. Toxicity

The structure of Fuc-GM1 is homologous across all species, and BMS-986012 demonstrates high affinity binding in all species including mice, rats, cynomolgus monkeys, and humans. The nonclinical safety of BMS-986012 was evaluated in a series of in vitro tissue cross-reactivity studies and in vivo single- and repeat-dose intravenous (IV) toxicity studies. The BMS-986012 binding profile was similar in human and cynomolgus monkey tissues in the exploratory tissue cross reactivity study. In a single-dose exploratory IV toxicity study in rats (0, 10, 40, or 150 mg/kg), BMS-986012 was clinically tolerated at 10 mg/kg. The primary BMS-986012-related finding at all doses was dose-related hemolytic anemia and associated clinical toxicity resulting in humane euthanasia of all rats at >40 mg/kg by Day 8. This hemolytic anemia was considered to be pharmacologically mediated due to expression of Fuc-GM1 on rat erythrocytes (Iwamori, M. et al., Glycoconjugate 1, 26:467-476 (2009)). Fuc-GM1 is not expressed on erythrocytes in other species including humans. Based on these findings, which are not considered to be relevant to humans, the rat was considered to be unacceptable for toxicological assessment of BMS-986012. The mouse was selected as the rodent species for further toxicology evaluation of BMS-986012.

In a pivotal 1-month IV toxicity study in mice (0, 10 or 150 mg/kg, QW, 5 doses), testicular toxicity characterized by decreased testes weights with a microscopic correlate of bilateral germ cell degeneration, retention of spermatids, and Sertoli cell vacuolation was observed at both doses. The testicular toxicity observed in mice was considered pharmacologically mediated and species specific due to expression of Fuc-GM1 in mouse testes (Iwamori, M. et al., Biochem. J., 380:75-81 (2004); Sandhoff, R. et al., J. Biol. Chem., 280:27310-27318 (2005)). Fuc-GM1 is not expressed in testes of other species, including humans; therefore, testicular toxicity in mice is considered not to be a concern in humans. The high dose of 150 mg/kg was clinically tolerated, whereas the low dose of 10 mg/kg resulted in mortality following at least 2 weekly doses that was considered a consequence of an anti-drug antibody (ADA)-mediated hypersensitivity. After a 6-week recovery period, there was partial recovery of the BMS-986012-related testicular changes at 10 mg/kg and progression of testicular toxicity at 150 mg/kg. A NOAEL was not established in this pivotal study due to mortality at 10 mg/kg and testicular findings at 10 and 150 mg/kg. The cause of the moribundity/mortality at 10 mg/kg was not apparent from gross and microscopic examination of the tissues. However, considering that these deaths occurred shortly after repeated IV doses, the acute nature of the clinical signs, the presence of ADA in this group (in satellite animals; ADAs were not analyzed in the mice that were found dead or euthanized early), and the absence of BMS-986012-related clinical signs or mortality at the high dose of 150 mg/kg, these deaths at 10 mg/kg likely were a consequence of an ADA-mediated hypersensitivity reaction. A follow-up exploratory immunotoxicity study in mice was conducted to determine the potential contribution of ADA-mediated hypersensitivity as the cause of the moribundity and mortality at 10 mg/kg. In this study (0, 10, or 150 mg/kg, QW, up to 5 doses) in female mice, BMS-986012-related moribundity and mortality again occurred only at 10 mg/kg with a strong correlation with high ADA levels. The occurrence of BMS-986012-related effects (moribundity and mortality) only at the low dose of 10 mg/kg, their onset after multiple injections, and the strong correlation with high ADA levels provide a weight of evidence of an ADA-mediated hypersensitivity reaction (Michael, W. L. et al., *Toxicol. Pathol.*, 42:293-300 (2014)). This conclusion is further supported by the lack of these findings in repeat dose studies (10 mg/kg, IP, up to 14 doses) in SCID mice, which cannot generate antibody responses.

In an exploratory single-dose IV toxicity study in cynomolgus monkeys (0, 10, 40, or 150 mg/kg), BMS-986012 was clinically well tolerated at all doses with no adverse effects at any dose. In the pivotal 1-month IV toxicity study in monkeys (0, 10 or 150 mg/kg, QW, 5 doses), BMS-986012 was clinically well tolerated at all doses. Adverse findings were limited to the high dose of 150 mg/kg and included decreases in circulating neutrophils (0.02 to 0.54×) and platelets (0.32 to 0.50×) and increased spleen size/weight and minimal subacute splenic inflammation. Decreases in platelets and neutrophils were mostly seen in animals with high ADA levels and was likely due to Fc-mediated binding of BMS-986012/ADA immune complexes to these cells resulting in clearance predominantly in the spleen. After a 2-month recovery period, all BMS-986012-related changes were partially to fully reversible. The low dose of 10 mg/kg (mean combined-sex AUC [0-168h] 54,600 μg•h/mL) was considered a NOAEL. The high dose of 150 mg/kg (mean combined-sex AUC [0-168h] 733,000 μg•h/mL) was considered the HNSTD since it was clinically tolerated and all adverse histopathology findings were reversible.

No significant irritation or local tolerance issues were observed at the injection sites following repeated IV dose administration of BMS-986012 as a slow bolus injection at up to 150 mg/kg administered in the pivotal toxicity studies in mice and cynomolgus monkeys. There were no BMS-986012-related cardiovascular, respiratory, ophthalmologic, or neurological effects at ≤150 mg/kg in monkeys (mean $C_{max}$≤6,870 μg/mL). In a GLP-compliant tissue cross-reactivity study in normal human tissues, there was binding of BMS-986012-FITC to neural elements (ganglion and satellite cells and axons) that was anticipated based on literature reports of Fuc-GM1 expression in peripheral nerves and dorsal root ganglia (Yoshino, H. et al., J. Neurochem., 61(2):658-663 (1993); Kusunoki, S. et al., Brain. Res., 494(2):391-395 (1989)). Expression of Fuc-GM1 in healthy tissue is very limited; however, expression has been associated with sensory nerves in monkeys and humans, making peripheral neuropathy a potential target liability of BMS-986012. Although Fuc-GM1 is reported to be expressed in neural tissues of monkeys, BMS-986012 (150 mg/kg, Q2W, IV) when given alone to monkeys for 3 months did not produce neurotoxicity or nerve conduction deficits. Additionally, there was no BMS-986012-FITC-specific staining in any of the adjacent-to-tumor lung samples from smokers or nonsmokers, suggesting that smoking did not induce the expression of Fuc-GM1 in normal human lung tissue. Overall, the nonclinical toxicology assessment of BMS-986012 has demonstrated an acceptable safety profile, supporting clinical use in subjects with cancer.

Example 3

A Phase 1/2 Multicenter Study of BMS-986012 in Subjects with Relapsed/Refractory Small Cell Lung Cancer 1. Objectives The primary objective of the study is to determine the multidose safety, tolerability, dose limiting toxicities (DLTs), and the maximally tolerated dose (MTD) of BMS-986012 administered as monotherapy in subjects with relapsed or refractory SCLC.

Secondary objectives include characterizing the pharmacokinetics (PK) of BMS-986012, investigating the preliminary anti-tumor activity of BMS-986012 as measured by objective response rate (ORR), duration of response, and progression-free survival (PFS), characterizing the immunogenicity of BMS-986012, and assessing the effect of BMS-986012 on the QT interval.

Additional exploratory objectives include exploring associations between shed Fucosyl-GM1 (Fuc-GM1) at baseline and anti-tumor activity, exploring associations between baseline Fuc-GM1 positive circulating tumor cells (CTCs) and anti-tumor activity, exploring associations of baseline NK-cell numbers, phenotype (by FACS) and complement levels with pharmacodynamic changes and anti-tumor activity, exploring Fuc-GM1-related biomarkers such as, but not limited to, markers of neuroendocrine differentiation as potential prognostic markers of anti-tumor activity, exploring associations between Fc gamma receptor (FcγR) polymorphisms with anti-tumor activity, exploring the PK-PD relationship(s) of BMS-986012, and assessing overall survival (OS).

2. Study Design and Duration

Figure 3:
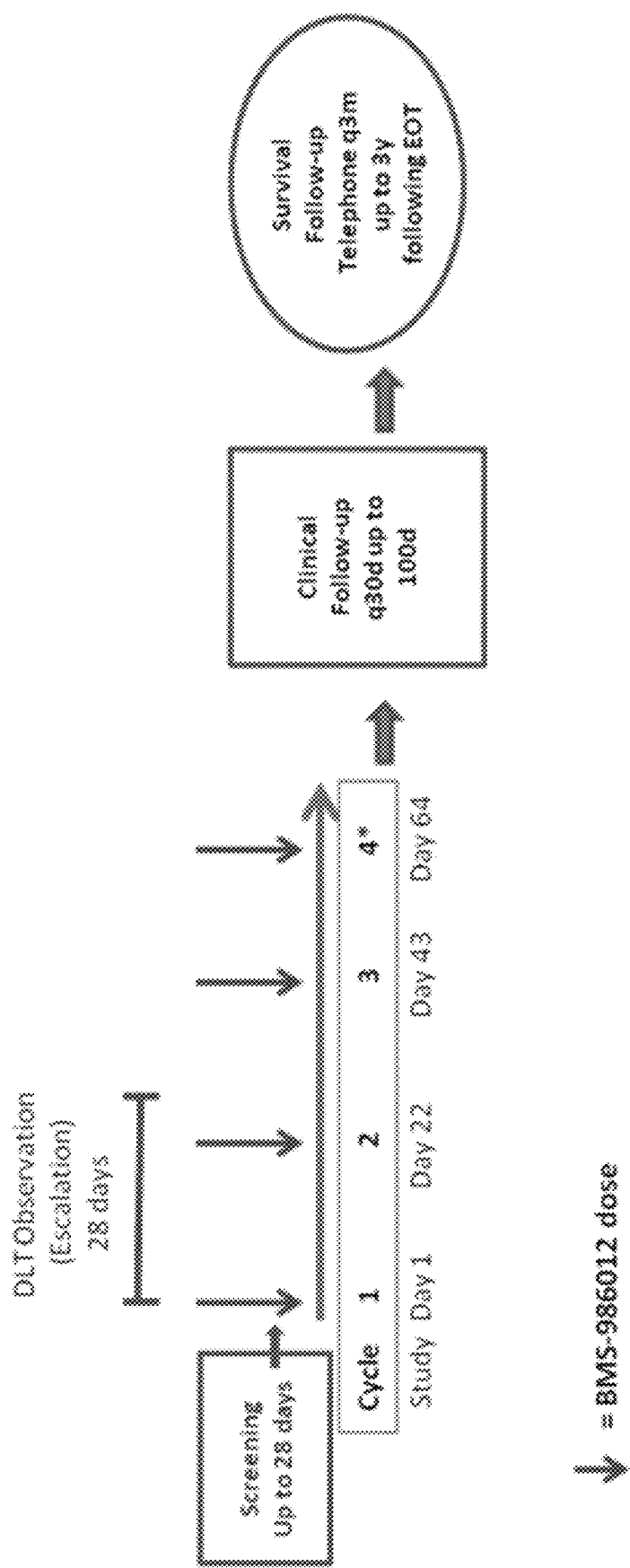
FIG. 3 is a schematic illustrating the study design of the clinical trial CA001030.

This is an open-label ascending multiple dose study of BMS-986012 administered once every 21 days (one cycle) as a single agent and is conducted in two parts. Dose escalation (Part 1) is to identify a potential MTD, or maximum administered dose (MAAD) if no MTD is determined. In Part 2, additional subjects with SCLC are enrolled at two doses at or below the MTD or MAAD to confirm safety and evaluate efficacy at these doses. A study schematic is shown in FIG. 3.

Subjects complete up to 4 periods in the study: Screening (up to 28 days), Treatment (until meeting protocol-specified discontinuation criteria), Clinical Follow-up (approximately 100 days), and Survival Follow-up (up to approximately 3 years). Screening and Treatment periods are calculated relative to the first dose of study drug, while follow-up periods are calculated relative to the last dose of study drug.

Each treatment cycle consists of an IV infusion of BMS-986012 every 21 days. Tumor response is assessed using Response Evaluation Criteria for Solid Tumors version 1.1 (RECIST v 1.1). Subjects are allowed to continue treatment until documentation of progressive disease or symptomatic deterioration, withdrawal of consent, unacceptable adverse events, and/or meeting other protocol-specified criteria for discontinuation.

After completion of the Clinical Follow-up period, subjects enter the Survival follow-up period to collect data on survival status. Subjects with stable disease, partial or complete response at the end of the Clinical Follow-up period also undergo tumor assessments every 3-4 months or as per institutional guidelines until progression or starting a new anti-cancer therapy. Subjects who have progressed in survival follow-up are allowed to receive further anti-cancer therapy as required. The end of the study occurs after the last treated subject has been followed for at least 6 months from his/her last treatment date.

3. Dose Escalation (Part 1)

Enrollment in dose escalation and MTD selection adheres to a modified Toxicity Probability Interval (mTPI) design (Ji, Y. et al., J. Clin. Oncol., 31:1785-1791 (2013)), using cohorts of 3-6 subjects within a dose level, and allowing flexible decision-making based on a minimum required cohort size. The design provides a simple algorithm for decisions on escalation, expanding at the same dose, and de-escalation, depending on the number of observed toxicities after each dose cohort. The mTPI was selected over the rule based 3+3 design as the mTPI is more likely to select the true MTD and treat fewer subjects at suboptimal doses. The mTPI method utilizes a target toxicity (DLT) rate and equivalence interval (EI) to make decisions on escalation after each cohort and to estimate the maximum tolerated dose (MTD). For this study the target DLT rate is 25% and the EI is 23%-27%. A total of approximately 30 evaluable subjects are treated across the proposed dose levels as shown in Table 2. Doses intermediate to those specified may be evaluated if agreed upon by the Sponsor/Medical Monitor and Investigators, provided the dose escalation increments are smaller than those specified. No intra-subject dose escalation of BMS-986012 is allowed at any dose level.

TABLE 2

Expected Dosages During Dose Escalation[a]

| Dose Level Number | BMS-986012 (mg IV Q3W) |
| --- | --- |
| −1 | 21 |
| 1 | 70 |
| 2 | 160 |
| 3 | 400 |
| 4 | 1000 |

[a]Interim doses may be explored.

Dose escalation begins with Dose Level 1 and is guided by the number of DLTs observed in 3-6 subjects treated initially per dose cohort and evaluable for safety for at least 28 days; additional subjects may be enrolled in cohorts of 3 to the same dose level if needed. To minimize risks to subjects from unanticipated acute toxicities, a waiting period of at least 5 days occurs between administration of the first dose for the first, second, and third subjects to create an observation period prior to subsequent subject exposures. This waiting period is mandatory only in Dose Level 1.

Figure 4:
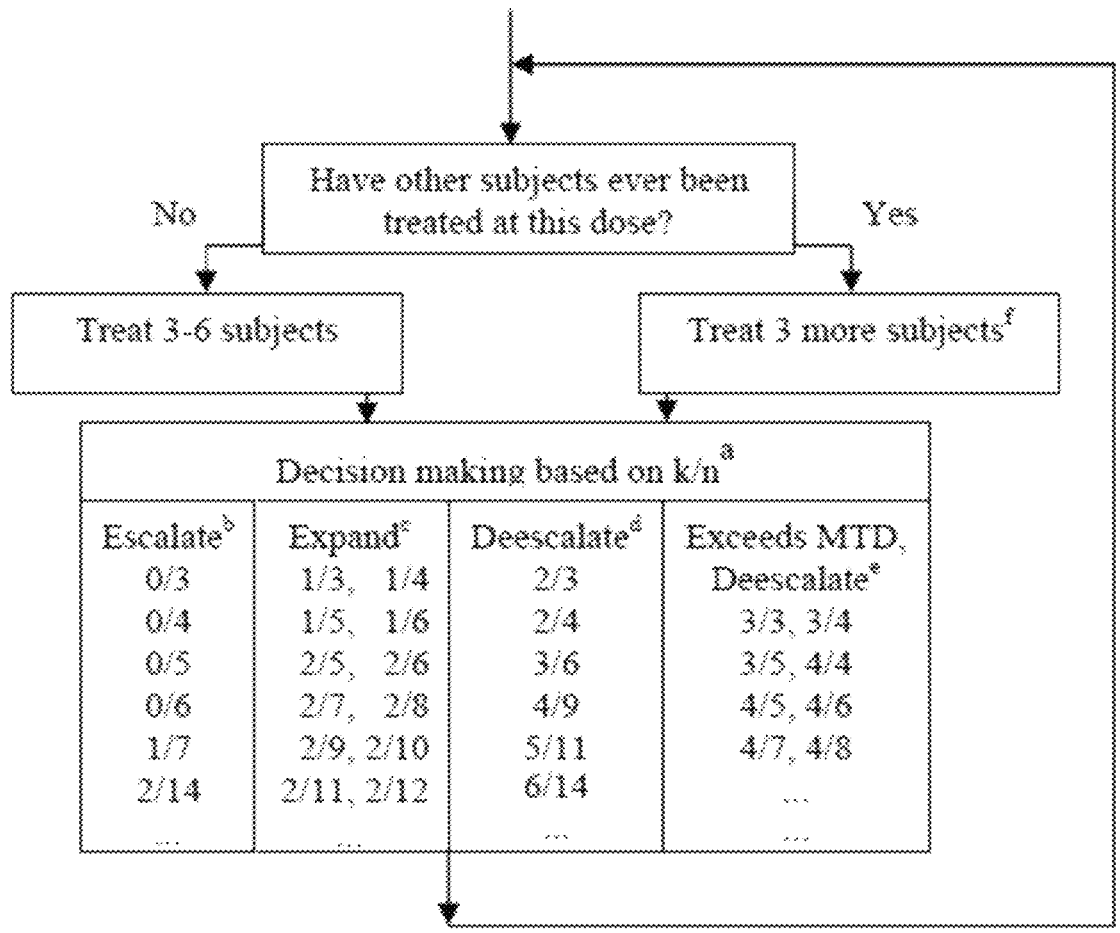
FIG. 4 is a schematic illustrating dose escalation algorithm.

Decisions to escalate, add more subjects to the current dose, deescalate, or deescalate and declare the current dose as unacceptable (exceeding the MTD), are based on the rate of DLTs in evaluable subjects within the 28-day DLT evaluation period (FIG. 4). DLT-evaluable subjects are defined as those receiving 2 doses of study drug in the first 28 days of dosing. At least 3 DLT-evaluable subjects are required to enable a decision to escalate, add more subjects to the current dose level, or de-escalate.

FIG. 4 shows examples of scenarios guiding decision making that may be encountered during dose escalation with respect to the number of DLT evaluable subjects and the number of subjects with a DLT. In addition to escalation or expansion decisions, dose re-escalation is permitted after a decision to de-escalate is made, except when a dose has been identified as exceeding the MTD. Therefore, a dose level could be revisited multiple times under the mTPI design.

At the end of the escalation phase, the cumulative number of subjects who experience a DLT is used to estimate the MTD using isotonic regression.

4. Dose Expansion (Part 2)

Doses selected for Part 2 do not exceed the MTD or MAAD, but dose selection may incorporate assessment of other data including toxicities and PK from Part 1. Part 2 evaluates toxicity and preliminary efficacy of BMS-986012 as second-line monotherapy in subjects who have relapsed following first-line chemotherapy as follows: (Table 3) Cohort A: ≤3m response duration (refractory) at the MTD/MAAD identified in Part 1, Cohort B: ≤3m response duration (refractory) at a dose level below the MTD/MAAD, Cohort C: >3m response duration (sensitive) at the MTD/MAAD, and Cohort D: >3m response duration (sensitive) at a dose level below the MTD/MAAD. The response duration referenced above is relative to prior first-line therapy. Approximately 22 refractory and 28 sensitive subjects are treated per cohort. Enrollment is guided by the Simon 2-stage design framework.

TABLE 3

Dose Expansion Cohorts

Dose Expansion Cohorts

| Cohort | Definition | Maximum*Approximate Number of Evaluable Subjects |
|---|---|---|
| A | Relapsed/refractory[a,b] | 22 |
| B | Relapsed/refractory[a,c] | 22 |
| C | Sensitive[b,d] | 28 |
| D | Sensitive[c,d] | 28 |

[a]≤3 mo response duration from most recent cancer therapy
[b]at MTD/MAAD
[c]at a dose below MTD/MAAD
[d]>3 mo response duration from most recent cancer therapy
*Fewer subjects may be treated in a cohort with no evidence of tumor activity, as guided by a Simon 2-Stage design.

Antitumor activity is assessed in approximately the first 9 or 10 evaluable subjects treated in each cohort, with the option to stop enrolling in a cohort without an initial anti-tumor activity signal. The number of subjects needed for the Stage 1 review is guided by a Simon 2-Stage design, assuming a 25% desirable response rate (vs. 10%) for refractory disease, and a 40% (vs. 25%) for sensitive disease. In this setting, if none of the first 9 evaluable subjects in the refractory cohort or if fewer than 3 subjects of the first 10 evaluable subjects in a sensitive cohort demonstrate clinical activity, enrollment in the cohort meeting criteria may not continue. As the expected time of response relative to dose initiation and the actual enrollment rate are unknown, it is expected that during the efficacy evaluation of subjects in Stage 1, more subjects may enroll and begin receiving treatment than the minimum needed for the Stage 1 assessment. Therefore, the above numbers are approximate and enrollment continues during the evaluation of the interim data.

Evaluation of toxicity events in the cohort expansions is performed throughout enrollment. If the aggregate rate of toxicities meeting DLT criteria exceeds 27% across all subjects treated in all cohorts, the findings are discussed by Investigators and the BMS study team and further enrollment may be interrupted. Depending on the nature and grade of toxicity and after assessing the risk/benefit ratio, additional subjects may be treated at, below, or intermediate to a dose level previously found to be safe following discussion by the Sponsor/Medical Monitor and Investigators based on the available data. Selection of a dose or doses for these additional cohorts is guided by accumulated safety and efficacy data; modeling may also be used to explore potential dose-response relationships.

Following each treatment cycle, the decision to treat a subject with additional cycles of study therapy is based on assessment of toxicity and tumor assessment. Subjects are generally allowed to continue study therapy until the subject meets criteria for discontinuation of study therapy as outlined in Section 3.5.

Available fresh tumor biopsies (either in the form of snap-frozen or otherwise unfixed tissue or a new tumor tissue if the biopsy procedure may be performed with minimal risk to the subject as judged by the Investigator), are evaluated for Fucosyl-GM1 expression and Fucosyl-GM1-related biomarkers including but not limited to neuroendocrine biomarkers. If available, archived biopsies are evaluated for Fucosyl-GM1-related biomarkers including but not limited to neuroendocrine markers.

5. Dose-Limiting Toxicity

For the purpose of guiding dose escalation, DLTs are defined based on incidence, intensity, and duration of adverse events (AEs) for which no clear alternative cause is identified. Subjects must receive 2 doses of study drug during the 28-day DLT evaluation period to be considered evaluable for dose escalation decisions. Adverse events are graded according to the National Cancer Institute (NCI) Common Terminology Criteria for Adverse Events version 4.03 (CTCAE v 4.03). For the purpose of subject management, any AE that meets DLT criteria, regardless of the cycle in which it occurs, leads to dose interruption. AEs occurring after the 28 day DLT period are considered for the purposes of defining the MTD upon agreement between the Sponsor/Medical Monitor and Investigators, if they are determined to have no clear alternative cause and are not related to disease progression.

Dose escalation is based on the number of DLTs experienced, as guided by the escalation design algorithm (FIG. 4) and agreed upon by the Medical Monitor and the Investigators. No intra-subject dose escalation is allowed. Subjects who withdraw from the study during the DLT evaluation interval for reasons other than a DLT may be replaced at the same dose level.

6. Duration of Study

The screening period lasts up to 28 days. Subjects receive BMS-986012 every 21 days until meeting protocol-specified criteria for discontinuation. The clinical follow-up period is approximately 100 days following the last treatment with BMS-986012, including subjects discontinuing the study for disease progression unless subjects have withdrawn consent or initiated additional anti-cancer therapy. After completing the clinical follow-up period, subjects continue to be followed for overall survival up to 3 years from end of treatment. Subjects with stable disease, partial or complete response at EOT also undergo tumor assessment every 3-4 months or as per institutional guidelines until progression or starting a new anti-cancer therapy. The end of the study occurs after the last treated subject has been followed for at least 6 months from his/her last treatment date.

7. Number of Subjects

During dose escalation (Part 1) up to approximately 30 evaluable subjects are expected to be treated. Although the exact number per dose level depends on the number of observed toxicities, approximately 3-9 subjects are expected to be enrolled in each dose level during dose escalation. In Part 2, approximately 100 evaluable subjects are treated. Approximately 170 subjects are estimated to be enrolled in this study, including subjects screened but not meeting eligibility criteria and subjects treated but requiring replacement.

Additional subjects may be enrolled in escalation or expansion cohorts, if needed to maintain a sufficient number of subjects evaluable for safety or antitumor activity.

8. Study Population

Men and women at least 18 years of age with histological or cytological confirmed SCLC and ECOG Performance Status 0-1 and meeting all other eligibility criteria may participate in the study. Subjects must not have symptomatic or untreated CNS metastases. All SCLC subjects must have relapsed after or be deemed refractory to first-line standard of care chemotherapy. Subjects who have received second- or third-line therapy are eligible for the dose escalation phase (Phase 1) but not the dose expansion phase (Phase 2).

Women of childbearing potential must not be nursing or pregnant. All women must have a negative pregnancy test within 24 hours prior to dosing with study medication.

9. Study Drug

Study Drug for CA001030 can be found in Table 4 below.

TABLE 4

| Medication | Potency | Investigational Product (IP)/Non-IP |
|---|---|---|
| BMS-986012 (Solution for Injection) | 120 mg/vial (30 mg/mL) | IP |

10. Study Assessments

Safety Outcome Measures: Adverse events are assessed during treatment and until 100 days after the last treatment. Serious adverse events are collected from the time a subject signs informed consent and for approximately 100 days after the last treatment. Adverse events are coded using the most current version of MedDRA and reviewed for potential significance and importance. Adverse events are evaluated according to the NCI CTCAE Version 4.03. Subjects should be followed until adverse events have recovered to grade ≤1 or baseline, or are deemed irreversible by the Investigator. Safety assessments are based on medical review of adverse event reports and the results of vital sign measurements, ECGs, physical examinations, clinical laboratory tests, and available radiographic tests. Serial ECGs are collected from a minimum of 50 subjects across doses with most subjects at the MTD (MAAD) to measure QT, other ECG intervals and heart rate to explore the potential effect of study drug on QTc.

Pharmacokinetic Measures: Pharmacokinetic parameters ($C_{max}$, $T_{max}$, $C_{tau}$, $AUC_{0-t}$, $AUC_{tau}$) are derived from serum concentration versus time data by compartment model independent data analysis methods. Efficacy Measures: Disease assessments using computed tomography (CT) and/or magnetic resonance imaging (MRI) as appropriate, are performed at baseline and every 6 weeks (every 2 cycles) until disease progression or as planned per protocol. Tumor responses are determined by the Investigator for subjects with adequate data as defined by RECIST v 1.1. At the Sponsor's discretion, de-identified scans and measurements may be collected and reviewed by independent radiologists using RECIST v 1.1 criteria at a later date, or at any time during the study.

Immunogenicity Measures: Serum samples to evaluate development of positive anti-drug antibody (ADA) response to BMS-986012 are collected at specified time points.

Exploratory Biomarker Measures: Baseline subject level total shed Fuc-GM1, CTC counts and Fuc-GM1 positive CTC counts are measured. Post-treatment shed Fuc-GM1 may be tested with technologies including but not limited to ELISA. Measurement of baseline and post-treatment subject level NK and monocyte/macrophage counts, NK immunophenotyping and complement assessment is also planned. Germline DNA assessments are conducted from whole blood collected on Day 1 to assess inherited genotypes of the IgG-binding FcγR family. Genomic DNA is isolated and specific single nucleotide polymorphisms (SNPs) of FcγRIIIa (158V/F), FcγRIIa (131H/R), and FcγRIIIb (NA1/NA2) are evaluated by PCR to determine potential associations with anti-tumor activity. All available fresh biopsies are evaluated for Fuc-GM1 expression and Fuc-GM1 related biomarkers including but not limited to neuroendocrine biomarkers. Any available archived FFPE biopsies are evaluated for Fuc-GM1 related biomarkers including but not limited to neuroendocrine biomarkers.

11. Statistical Considerations

Sample Size:

For Dose Escalation, a total of approximately 30 evaluable subjects are expected to be treated during dose escalation. The exact number depends on the number of observed DLTs, and is guided by the escalation design, which selects a MTD with a 25% target DLT rate, while also taking into account the number of early dropouts.

For Dose Expansion, the total sample size per each expansion cohort (approximately n=22 for refractory and approximately n=28 for sensitive) is planned to provide reasonably reliable estimates for ORR, and adequate false positive and false negative rates. In addition, as guided by a Simon 2-stage design, a minimum of 9 and 10 evaluable subjects per refractory or sensitive cohort are expected to be treated in Stage 1 to allow for an initial evaluation of efficacy. The probability of early stopping is 39% (minimax design) with 9 subjects in a refractory cohort and 53% (optimal design) with 10 subjects in a sensitive cohort. The number of subjects receiving treatment at the time of the Stage 1 efficacy evaluation is approximate and may exceed the minimum number of evaluable subjects required for response assessment due to unknown time expected for a potential response, and the unknown true recruitment rate. In the refractory tumor expansion cohort of approximately 22 subjects with an assumed 25% true ORR, there is an 84% chance of observing at least 4 responses, a 68% chance of observing at least 5 responses, and a 16% chance of observing 3 or fewer responses (false negative rate). If the true ORR is 10% instead of 25%, then there is a 17% and 6% chance respectively that there are at least 4 or at least 5 responses in 22 subjects (false positive rate). In addition, if 4 or 5 responses are observed, assuming a 25% ORR, then the lower limit of the 80% CI for the ORR is 8.2% or 12% respectively.

For the sensitive tumor expansion cohort of 28 subjects and an assumed 40% true ORR, there is an 85% chance of observing at least 9 responses, a 74% chance of observing at least 10 responses, and a 15% chance of observing 8 or fewer responses (false negative rate). If the true ORR is 25% instead of 40%, then there is 25% and 14% chance respectively that there are at least 9 or at least 10 responses in 28 subjects (false positive rate). In addition, if 8 or 9 responses are observed, assuming a 40% ORR, then the lower limit of the 80% CI for the ORR is 17% or 20% respectively. The confidence interval calculations are based on the Clopper-Pearson method for exact confidence intervals.

12. Endpoints

The primary endpoint of this phase 1/2 study is safety as measured by the rate of adverse events (AEs), serious adverse events (SAEs), discontinuations due to AEs, deaths, and clinically significant laboratory abnormalities. Safety is evaluated once a subject signs informed consent through Clinical Follow-up.

Secondary endpoints include efficacy, pharmacokinetics, immunogenicity, and exploratory biomarkers.

(1) Efficacy: The objective response rate (ORR), duration of response, and progression free survival (PFS) are assessed based on RECIST v 1.1 criteria. In addition, PFS rates at pre-specified timepoints, e.g., 24, 36 weeks are assessed. Individual best overall response (BOR) is a subject level endpoint. The above is determined based on tumor measurements occurring every 6 weeks during the Treatment Period, and at approximately the 100-day Clinical Follow-up visit, according to institutional practice. Subjects not progressing at discontinuation of study treatment undergo tumor assessments every 3-4 months or as per institutional practice until the date of the first objective documentation of tumor progression or death due to any cause.

(2) Pharmacokinetics: $C_{max}$, $T_{max}$, $C_{tau}$, $AUC_{0-t}$, $AUC_{tau}$ (3) Immunogenicity: Occurrence of specific anti-drug antibodies (ADA) to BMS-986012. Samples are collected at multiple time points.

(4) Exploratory Biomarkers: Shed Fuc-GM1, Fuc-GM1 positive CTCs, NK and monocyte/macrophage counts, NK immunophenotyping, complement levels and FcγR polymorphisms. If available, Fuc-GM1 IHC of fresh biopsies and evaluation of Fuc-GM1 related biomarkers of archived FFPE biopsies including but not limited to neuroendocrine biomarkers.

13. Analyses

Safety Analysis: All recorded adverse events are listed and tabulated by system organ class, preferred term and treatment. Vital signs and clinical laboratory test results are listed and summarized by treatment. Any significant physical examination findings, and clinical laboratory results are listed. ECG readings are evaluated by the Investigator and abnormalities, if present, are listed. For subjects with serial ECG measurements, changes in the QTcF (ΔQTcF), ECG intervals QRS, and PR, and in heart rate (ΔHR) are tabulated by dose and study day. Scatter plots of heart rate, ΔHR, QTcF, and ΔQTcF, vs time-matched BMS-986012 concentrations are provided. A concentration-response effect of BMS-986012 on QTcF may be assessed by a linear mixed effects regression model for ΔQTcF on plasma concentrations, stratified by study day, as well as pooled across days.

Efficacy Analyses: Individual best overall response (BOR), duration of response and PFS are listed using RECIST v 1.1 criteria. BOR outcomes are tabulated by disease type and dose. The objective response rate (ORR) and PFS rates (e.g., at 24 weeks) and the confidence interval are provided by dose and overall for each disease type. The duration of response and PFS are estimated by Kaplan-Meier (K-M) methodology by disease type. Presentations of efficacy include subjects in cohort expansion and subjects in dose escalation matching the dose and disease type (refractory or sensitive). Individual changes in the tumor burden over time are presented graphically by dose within a disease type. Overall survival is also assessed as part of exploratory efficacy analysis, by Kaplan-Meier plots and medians and OS rates, at specified timepoints, e.g., at 6 or 12 months.

Pharmacokinetic Analyses: PK parameters are summarized by dose. Descriptive statistics are presented for $C_{max}$, $C_{tau}$, $AUC_{0-t}$, and $AUC_{tau}$. Medians and ranges are presented for $T_{max}$.

Immunogenicity Analyses: All available immunogenicity data are listed, with flags for subjects with at least one positive anti-drug antibody (ADA) at any time point. The frequency of subjects with at least one positive ADA assessment, and frequency of subjects who develop ADA after a negative baseline assessment are provided. Associations of immunogenicity measures with PK and/or select AE may be explored.

Exploratory Biomarker Analyses: Analysis to explore associations of baseline markers with efficacy measures is performed (e.g., graphically), for baseline value of shed Fuc-GM1 antigen levels, Fuc-GM1 positive CTCs, or relative Fuc-GM1 expression, and FcγR polymorphisms, and further assessed as needed by methods such as logistic regression. The pharmacodynamic effect on markers is assessed by summary statistics and plots over time by dose to explore patterns of change over time, and how the patterns differ among dose levels.

Interim Analysis: Data emerging from this study may be needed for timely decisions about adjustments to procedures in subsequent parts of the study. Therefore, data may be reviewed prior to the final lock of the study database. Additional interim analyses may also be performed for administrative purposes or publications. Analyses may only consist of listings, summaries, and graphs of the available data. No formal inferences requiring any adjustment to statistical significance level are performed. Efficacy analyses based on interim data may use response evaluable or all treated populations depending on the purpose of the analysis.

What is claimed is:

1. A method for treating a subject afflicted with small cell lung cancer (SCLC), comprising administering to the subject a therapeutically effective amount of a monoclonal antibody or an antigen-binding portion thereof that binds specifically to Fucosyl-GM1, wherein the antibody is administered at a dose of 400 mg once every 3 weeks for at least four treatment cycles; wherein the antibody or antigen-binding portion thereof comprises:
    (a) a heavy chain variable region CDR1 comprising SEQ ID NO: 5
    (b) a heavy chain variable region CDR2 comprising SEQ ID NO: 6;
    (c) a heavy chain variable region CDR3 comprising SEQ ID NO: 7;
    (d) a light chain variable region CDR1 comprising SEQ ID NO: 8;
    (e) a light chain variable region CDR2 comprising SEQ ID NO: 9; and
    (f) a light chain variable region CDR3 comprising SEQ ID NO: 10.

2. The method of claim 1, wherein the antibody or antigen-binding portion thereof comprises heavy and light chain variable regions comprising the sequences set forth in SEQ ID NOs: 3 and 4, respectively.

3. The method of claim 1, wherein the antibody is a human monoclonal antibody or a portion thereof.

4. The method of claim 3, wherein the antibody comprises a human IgG1 heavy chain constant region.

5. The method of claim 1, wherein the antibody is non-fucosylated.

6. The method of claim 1, wherein the antibody is formulated for intravenous administration.

7. The method of claim 1, wherein the subject has previously received an initial anti-cancer therapy.

8. The method of claim 7, where the subject has a relapsed or refractory SCLC.

9. The method of claim 1, wherein the method produces at least one therapeutic effect selected from a reduction in size of a tumor, reduction in number of metastatic lesions over time, complete response, partial response, and stable disease.

10. The method of claim 1, wherein administration of the antibody is continued for as long as clinical benefit is observed or until unmanageable toxicity or disease progression occurs.

* * * * *

SEQUENCE LISTING

```
<160> NUMBER OF SEQ ID NOS: 10

<210> SEQ ID NO 1
```

<211> LENGTH: 366
<212> TYPE: DNA
<213> ORGANISM: Homo sapiens

<400> SEQUENCE: 1

```
gaagtgcagc tggtggagtc tgggggaggc tcggtacagc ctggggagtc cctgagactc    60
tcctgtgtag cctctggatt caccttcagt aggtacaaga tgaactgggt ccgccaggct   120
ccagggaagg gactggaatg ggtttcatac attagtcgta gtggtcgtga catatactac   180
gcagactctg tgaagggccg attcaccatc tccagagaca atgccaagaa ctcactgtat   240
ctgcaaatga acagcctgag agacgaggac acggctgtgt attactgtgc gggaactgta   300
acgacatact actacgactt cggtatggac gtctggggcc aagggaccac ggtcaccgtc   360
tcctca                                                              366
```

<210> SEQ ID NO 2
<211> LENGTH: 321
<212> TYPE: DNA
<213> ORGANISM: Homo sapiens

<400> SEQUENCE: 2

```
gacatccaga tgacccagtc tccatcctca ctgtctgcat ctgtaggaga cagagtcacc    60
atcacttgtc gggcgagtca gggtattagc agctggttag cctggtatca gcagaaacca   120
gagaaagccc ctaagtccct gatctatgct gcatccagtt tgcaaagtgg ggtcccatca   180
aggttcagcg gcagtggatc tgggacagat ttcactctca ccatcagcag cctgcagcct   240
gaagattttg caacttatta ctgccaacag tataatagtt accctcccac tttcggcgga   300
gggaccaagg tggagatcaa a                                             321
```

<210> SEQ ID NO 3
<211> LENGTH: 122
<212> TYPE: PRT
<213> ORGANISM: Homo sapiens

<400> SEQUENCE: 3

Glu Val Gln Leu Val Glu Ser Gly Gly Gly Ser Val Gln Pro Gly Glu
1               5                   10                  15

Ser Leu Arg Leu Ser Cys Val Ala Ser Gly Phe Thr Phe Ser Arg Tyr
            20                  25                  30

Lys Met Asn Trp Val Arg Gln Ala Pro Gly Lys Gly Leu Glu Trp Val
        35                  40                  45

Ser Tyr Ile Ser Arg Ser Gly Arg Asp Ile Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Asp Glu Asp Thr Ala Val Tyr Tyr Cys
                85                  90                  95

Ala Gly Thr Val Thr Thr Tyr Tyr Tyr Asp Phe Gly Met Asp Val Trp
            100                 105                 110

Gly Gln Gly Thr Thr Val Thr Val Ser Ser
        115                 120

<210> SEQ ID NO 4
<211> LENGTH: 107
<212> TYPE: PRT
<213> ORGANISM: Homo sapiens

<400> SEQUENCE: 4

-continued

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Lys Pro Glu Lys Ala Pro Lys Ser Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Asn Ser Tyr Pro Pro
                85                  90                  95

Thr Phe Gly Gly Gly Thr Lys Val Glu Ile Lys
            100                 105

<210> SEQ ID NO 5
<211> LENGTH: 5
<212> TYPE: PRT
<213> ORGANISM: Homo sapiens

<400> SEQUENCE: 5

Arg Tyr Lys Met Asn
1               5

<210> SEQ ID NO 6
<211> LENGTH: 17
<212> TYPE: PRT
<213> ORGANISM: Homo sapiens

<400> SEQUENCE: 6

Tyr Ile Ser Arg Ser Gly Arg Asp Ile Tyr Tyr Ala Asp Ser Val Lys
1               5                   10                  15

Gly

<210> SEQ ID NO 7
<211> LENGTH: 13
<212> TYPE: PRT
<213> ORGANISM: Homo sapiens

<400> SEQUENCE: 7

Thr Val Thr Thr Tyr Tyr Tyr Asp Phe Gly Met Asp Val
1               5                   10

<210> SEQ ID NO 8
<211> LENGTH: 11
<212> TYPE: PRT
<213> ORGANISM: Homo sapiens

<400> SEQUENCE: 8

Arg Ala Ser Gln Gly Ile Ser Ser Trp Leu Ala
1               5                   10

<210> SEQ ID NO 9
<211> LENGTH: 7
<212> TYPE: PRT
<213> ORGANISM: Homo sapiens

<400> SEQUENCE: 9

Ala Ala Ser Ser Leu Gln Ser
1               5

```
<210> SEQ ID NO 10
<211> LENGTH: 9
<212> TYPE: PRT
<213> ORGANISM: Homo sapiens

<400> SEQUENCE: 10

Gln Gln Tyr Asn Ser Tyr Pro Pro Thr
1               5
```